US011067785B2

(12) United States Patent
Mo et al.

(10) Patent No.: US 11,067,785 B2
(45) Date of Patent: Jul. 20, 2021

(54) METHOD FOR GENERATING FLUORESCENT PHOTOGRAPH USING FLUORESCENCE MICROSCOPE

(71) Applicant: CARL ZEISS MICROSCOPY GMBH, Jena (DE)

(72) Inventors: Kai Mo, Shanghai (CN); Liwei Shen, Shanghai (CN); Xinyan Zeng, Shanghai (CN); Hailei Gu, Shanghai (CN)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/743,902

(22) Filed: Jan. 15, 2020

(65) Prior Publication Data
US 2020/0225458 A1 Jul. 16, 2020

(51) Int. Cl.
| G02B 21/36 | (2006.01) |
| G02B 21/00 | (2006.01) |
| G01N 21/64 | (2006.01) |
| G02B 21/16 | (2006.01) |

(52) U.S. Cl.
CPC ........... *G02B 21/361* (2013.01); *G01N 21/64* (2013.01); *G01N 21/6458* (2013.01); *G02B 21/16* (2013.01); *G02B 21/367* (2013.01); *G02B 21/368* (2013.01); *G01N 2021/6419* (2013.01)

(58) Field of Classification Search
CPC .... G02B 21/361; G02B 21/16; G02B 21/368; G02B 21/367; G01N 21/6458; G01N 21/64; G01N 2021/6419
See application file for complete search history.

(56) References Cited

U.S. PATENT DOCUMENTS

| 2006/0073509 | A1* | 4/2006 | Kilpatrick | G01N 33/689 435/6.11 |
| 2008/0015446 | A1* | 1/2008 | Mahmood | A61B 1/043 600/476 |
| 2008/0103390 | A1* | 5/2008 | Contag | A61B 90/36 600/427 |
| 2011/0121201 | A1* | 5/2011 | Palti-Wasserman | G01N 21/3504 250/458.1 |
| 2012/0062722 | A1* | 3/2012 | Sase | G01N 21/6458 348/79 |
| 2012/0150043 | A1* | 6/2012 | Mahmood | A61B 1/043 600/476 |
| 2016/0202465 | A1* | 7/2016 | Sase | G02B 21/16 382/164 |
| 2018/0275134 | A1* | 9/2018 | Isoda | G01N 33/587 |
| 2019/0137754 | A1* | 5/2019 | Sase | G02B 21/16 |

* cited by examiner

*Primary Examiner* — Mark R Gaworecki
(74) *Attorney, Agent, or Firm* — Shook, Hardy & Bacon L.L.P.

(57) ABSTRACT

The present invention discloses a method for generating a fluorescent photograph using a fluorescence microscope, wherein after a fluorescence image generated by the light of an optical channel is snapped, the fluorescent image generated by the light of the optical channel can be re-snapped and the original fluorescent image can be replaced with the re-snapped fluorescent image, without re-snapping a fluorescent image generated by the light of other optical channel which has already been snapped. Therefore, the time during which the sample is exposed to light is reduced, the sample is prevented from being bleached and the snapping time is saved.

12 Claims, 2 Drawing Sheets

METHOD FOR GENERATING FLUORESCENT PHOTOGRAPH USING FLUORESCENCE MICROSCOPE

CROSS REFERENCE TO RELATED APPLICATION

The present application claims priority to Chinese Patent Application No. CN201910035856.5, filed on Jan. 15, 2019, and the entire contents thereof is incorporated herein by reference.

TECHNICAL FIELD

The present invention relates to the field of optics and, in particular, to a method for generating a fluorescent photograph using a fluorescence microscope.

BACKGROUND TECHNOLOGY

Fluorescence can be classified into natural fluorescence and artificial fluorescence.

Natural fluorescence (or first-order fluorescence, spontaneous fluorescence, autofluorescence, and primary fluorescence) refers to the fact that certain materials do not need to be treated and can emit fluorescence when exposed to excitation light. For example, leaves, stems of plants, some tissues of animals (teeth, bone, claws, white hair, urine, plasma and vitamins), certain crystals, organic compounds, synthetics, oils, proteins, waxes, etc. can produce natural fluorescence. Therefore, natural fluorescence is used for inspection and identification in industries such as paper, fiber, dyes, chemicals, foods, and greases. In the environmental monitoring of air pollution, ultraviolet light is also used for dust fluorescence observation.

Artificial fluorescence (or second-order fluorescence, secondary fluorescence, stained fluorescence) refers to the fact that certain substances must be chemically treated, such as by fluorescent dyes (i.e., fluorescent pigment), to emit fluorescence under excitation light. Fluorescent pigments are a class of organic compounds that generate significant fluorescence and can be used as dyes, which can be classified into natural and synthetic. There are dozens of synthetic fluorescent pigments commonly used, such as acridine orange, rhodamine and the like. After the non-fluorescent sample is stained with the selected fluorescent pigment, the different cell tissues in the sample can be clearly distinguished by means of the color and contrast under a fluorescence microscope. Staining fluorescence methods have long been used in cytochemistry and histochemistry, for example, staining tuberculosis with Auramine.

Fluorescence has many practical applications, including mineralogy, gemology, medicine, chemistry, and biology. Especially in the field of life sciences, it is widely used in analytical chemistry, biochemistry, cell and analytical biology. Fluorescent labeling is a non-contact method for studying absorption and transport of substance, distribution and localization of chemical substances in cells, and is the basic tool for research. In recent years, in biological research, fluorescent labels have been widely used to calibrate biomolecules.

Immunofluorescence technique is a method in which a known antibody or antigen molecule is labeled with fluorescein, and when reacted with its corresponding antigen or antibody, a certain amount of fluorescein is present on the formed complex, and a fluorescent antibody-binding site is observed under a fluorescence microscope to detect an antigen or an antibody. This technique utilizes the specificity of an antibody against its antigen to target a fluorescent dye to a particular biomolecule target within the cell, thus allowing for the distribution of the target molecule to be observed through the sample. In practical applications, there are often multiple targets to be observed, so it is necessary to observe a variety of fluorescent labels.

A fluorescence microscope is a type of optical microscope and refers to a microscope that uses fluorescence to generate an image. The sample is illuminated with light of a particular wavelength (or band), and the incident light is absorbed by the fluorophore, causing the sample to emit fluorescence with longer wavelengths. By using a filter, the fluorescence emitted by the sample is separated from the much stronger illumination and imaged in a microscope.

In the application of fluorescence microscopy, it is often desirable to take images using multiple optical channels, each optical channel corresponding to light of one wavelength. For example, in bioluminescence, it is desirable to use light of different wavelengths to excite a sample, then to snap a series of fluorescent images produced by light of different wavelengths on a sample, and finally to merge all of the fluorescent images into one image to form a fluorescent photograph.

In current fluorescence microscopy, it is necessary to generate fluorescent images of a sample with light of different optical channels in a predetermined order, and then merge all the fluorescent images into one image. However, this technical solution has the following drawbacks:

During the snapping process, if the merged fluorescent photograph or the fluorescent image obtained by one optical channel is found to have low quality, it is not possible to re-snap only the fluorescent image produced by the light of the optical channel, but the fluorescence images generated by the light of all the optical channels must be re-snapped in the predetermined order. This can cause the sample to be bleached due to excessive exposure to light. In addition, the snapping time is wasted.

DISCLOSURE OF THE INVENTION

The starting point of the present invention is to provide a method for generating a fluorescent photograph using a fluorescence microscope, thereby solving the problem that the sample is exposed to light for too long during snapping.

An embodiment of the present invention provides a method for generating a fluorescent photograph using a fluorescence microscope, the fluorescence microscope being provided with a plurality of optical channels, each optical channel corresponding to the light of one wavelength, the method comprises:

separately snapping fluorescence images produced by illuminating the sample with light from a plurality of optical channels of the fluorescence microscope; then merging each of the fluorescent images into one image to generate a fluorescent photograph of the sample;

wherein, after a fluorescence image generated by the light of an optical channel is snapped, the fluorescent image generated by the light of said optical channel can be re-snapped and the original fluorescent image can be replaced with the re-snapped fluorescent image, without re-snapping a fluorescent image generated by the light of other optical channel which has already been snapped.

Optionally, fluorescent image display interfaces of the plurality of optical channels are freely switchable therebetween.[sic]

Optionally, the fluorescence microscope is arranged to snap fluorescent images generated by the plurality of optical channels in a certain order, and after snapping a fluorescent image generated by an optical channel, it can be switched to another optical channel which has been previously snapped and re-snap a fluorescent image generated by the optical channel.

Optionally, after snapping the fluorescent image of an optical channel, it automatically jumps to the next optical channel and waits for an instruction to snap a fluorescent image generated by the light of the next optical channel.

Optionally, the number of optical channels can be increased or decreased.

Optionally, a snapping parameter corresponding to each optical channel can be adjusted.

Optionally, the snapping parameter comprises exposure time, gain value, light source intensity, and filter configuration.

Optionally, a preview of the fluorescent photograph merged from the already snapped fluorescent image is displayed on a display screen used in conjunction with the fluorescence microscope.

Optionally, an icon corresponding to each optical channel is displayed on a display screen used in conjunction with the fluorescence microscope.

Optionally, the icon comprises a name of an optical channel, and the name is a wavelength of light corresponding to the optical channel.

Optionally, the icon comprises a color block, and the color of the color block is adjustable.

Optionally, a border of the icon can be highlighted to indicate that the optical channel corresponding to the icon is selected.

The method for generating a fluorescent photograph using a fluorescence microscope according to an embodiment of the present invention has at least the following advantages: after a fluorescence image generated by the light of an optical channel is snapped, the fluorescent image generated by the light of the optical channel can be re-snapped and the original fluorescent image can be replaced with the re-snapped fluorescent image without re-snapping a fluorescent image generated by the light of other optical channel which has already been snapped. Therefore, the time during which the sample is exposed to light is reduced, the sample is prevented from being bleached and the snapping time is saved.

DESCRIPTION OF THE ATTACHED DRAWINGS

DETAILED DESCRIPTION OF THE EMBODIMENTS

Embodiments of the present invention are described below with reference to the drawings. In the following description, numerous specific details are set forth to enable those skilled in the art to understand and practice the present invention. However, it will be apparent to those skilled in the art that the implementation of the present invention may not have some of these specific details. In addition, it should be understood that the present invention is not limited to the particular embodiments disclosed. Instead, it is contemplated that the present invention may be practiced with any combination of the features and elements described below, whether or not they are related to different embodiments. Therefore, the following aspects, features, embodiments and advantages are for illustrative purposes only and should not be considered as elements or limitations of a claim unless expressly stated in the claim.

Figure 1:
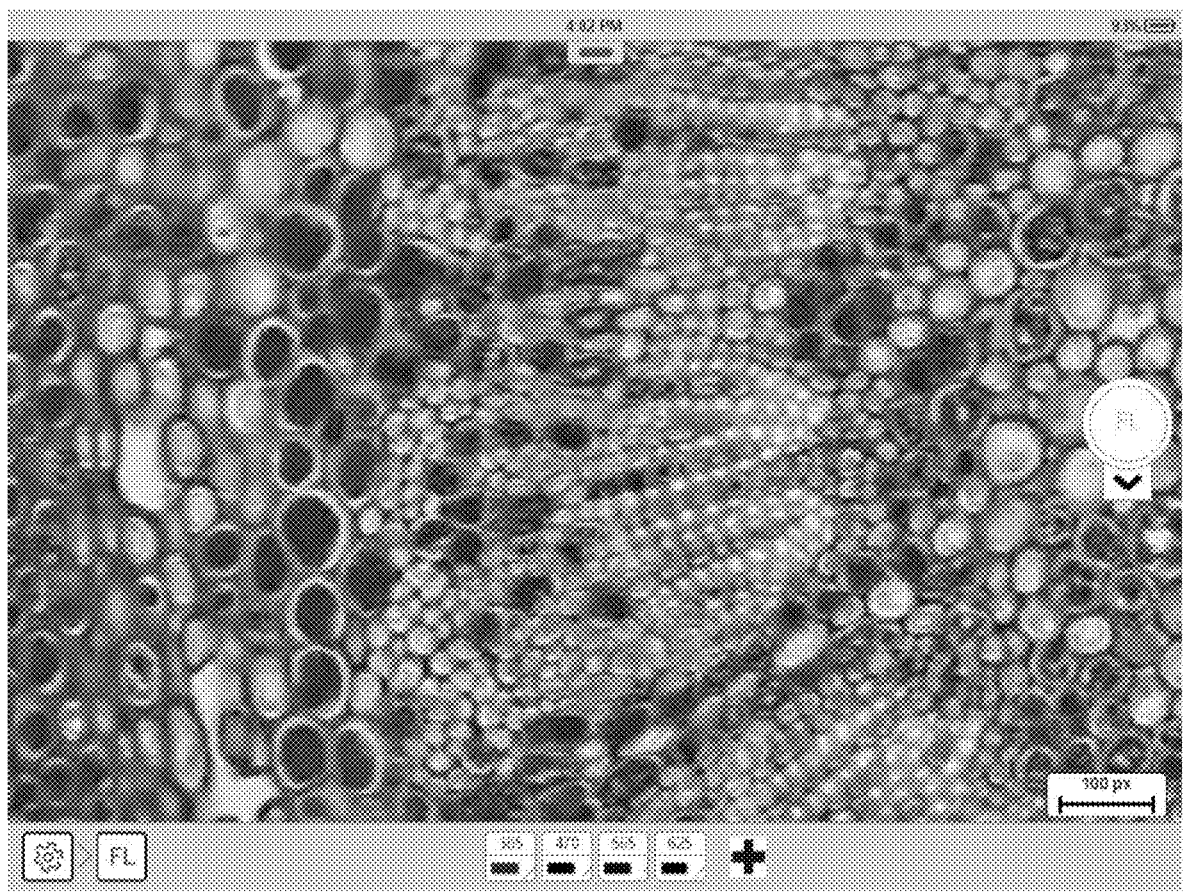
FIG. 1 shows a screenshot of a display screen used in conjunction with a fluorescence microscope in an embodiment of the present invention.
Figure 2:
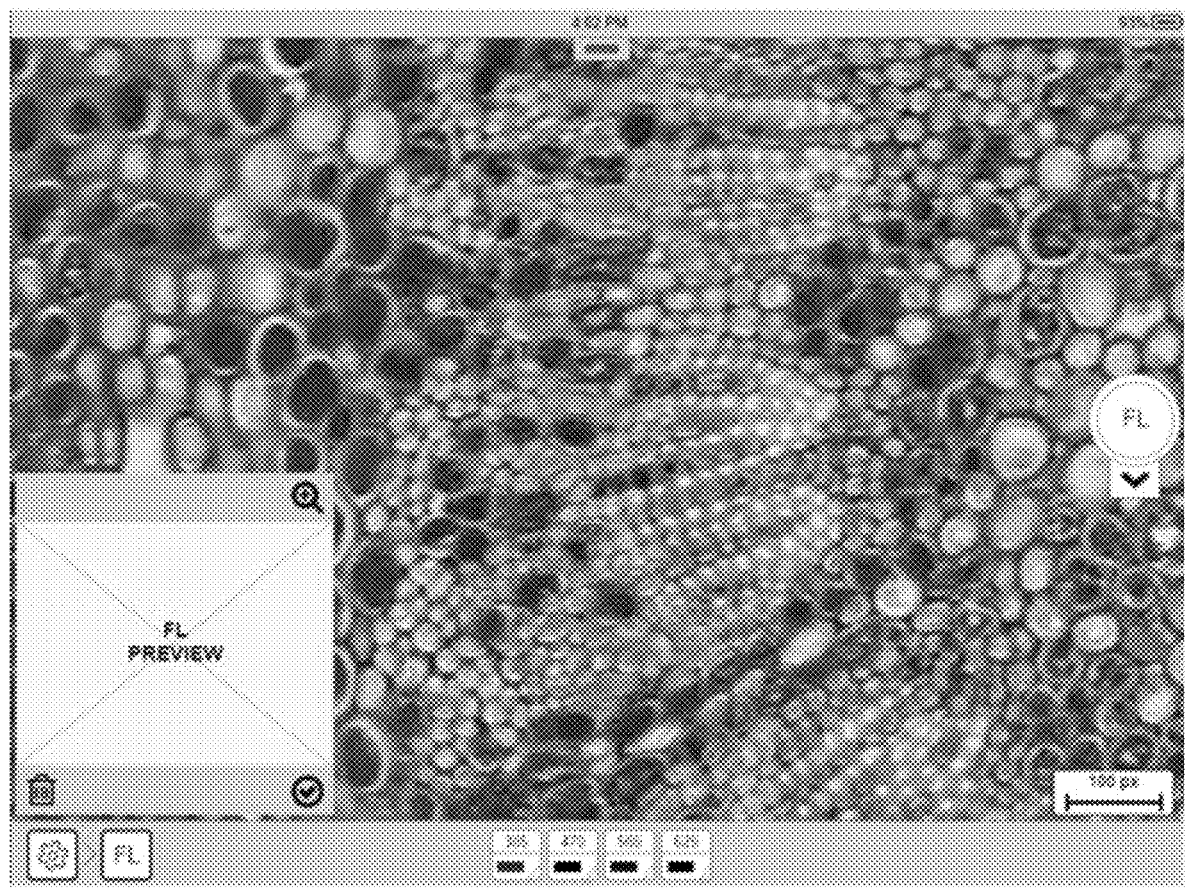
FIG. 2 shows a screenshot of a display screen used in conjunction with a fluorescence microscope in an embodiment of the present invention.

A first embodiment of the present invention discloses a method for generating a fluorescent photograph using a fluorescence microscope. The fluorescence microscope can be provided with a plurality of optical channels, each of which corresponds to light of one wavelength. FIGS. 1 and 2 show screenshots of a display screen used in conjunction with a fluorescence microscope. The display screen can be a dedicated display used in conjunction with a fluorescence microscope, or a display of a desktop computer, a laptop or a smart device such as smartphone connected to a fluorescent microscope via a wired or wireless network. As shown in FIG. 1, during the operation of the fluorescence microscope, a fluorescent image is displayed on the display screen of the display device, and four rectangular icons are displayed below the fluorescent image. The number in the upper part of the rectangle icon is the name of the optical channel corresponding to the icon, and the name of the optical channel may be the wavelength of light of the optical channel corresponding to the icon. As shown in FIG. 1, the names of the optical channels corresponding to the four rectangular icons are "385", "470", "565", and "625", respectively. The solid rectangular block at the bottom of the rectangle icon is a block with colors, and the color blocks of different rectangular icons are different in color to distinguish each icon. The color of the color block can be adjusted. The peripheral border of the rectangular icon can be highlighted (for example, sky blue) to indicate that the optical channel corresponding to the rectangular icon is selected. For example, when a rectangular icon is selected, the peripheral border of the rectangular icon can be changed from gray to sky blue, thereby indicating that the optical channel corresponding to the rectangular icon is selected, and the light of the optical channel is allowed to illuminate the sample to generate fluorescence image. At the same time, a fluorescent image of the currently selected optical channel is displayed in the background area of the user interface. When the user is satisfied with the quality of the fluorescent image generated by the light of the optical channel, the snapping operation can be performed.

A user of the fluorescence microscope can increase or decrease the number of optical channels as needed. When it is desired to change the number of optical channels, the user can add or delete the icon by clicking on the corresponding icon on the display screen of the display device. For example, in FIG. 1, there is a "+" icon on the right of the four rectangular icons, and the user can add a new rectangular icon by clicking on the "+" icon to add a new optical channel.

The snapping parameters corresponding to each optical channel can be adjusted. The user of the fluorescence microscope can change the snapping parameters (such as exposure time, gain value, light source intensity and filter configuration) of each optical channel according to actual needs.

As shown in FIG. 2, during the snapping, the fluorescence microscope can generate a preview image of the generated or merged fluorescent image according to the currently snapped fluorescent image in real time (i.e., PREVIEW in FIG. 2). The preview is displayed as a small window in the lower left corner of the currently displayed fluorescent image. The user of the fluorescence microscope can zoom in the small window to magnify the preview fluorescent photograph to see the details.

When an operator has made a judgment on the effect of the preview image, it can be chosen to end the snapping, switch to the next optical channel to continue snapping or switch to the previously snapped optical channel for re-snapping. In particular, during operation of the fluorescence microscope, the operator of the fluorescence microscope can click on each of the rectangular icons in any suitable order to snap fluorescent images generated by light of different optical channels. After snapping a fluorescent image generated by the light of one optical channel, the fluorescent image generated by the light of the optical channel can be re-snapped and the original fluorescent image can be replaced with the re-snapped fluorescent image, or it can be switched to a previously snapped optical channel to snap a fluorescent image and replace the original fluorescent image with the re-snapped fluorescent image, and then all the fluorescence images are merged again into one fluorescence photograph and the image quality is being judged. In this way, when the operator is dissatisfied with the quality of the merged fluorescent photograph, the fluorescent image of an optical channel can be re-snapped in a targeted manner to improve the image quality, and it is not necessary to re-snap the fluorescent images generated by the light of all the other optical channels that have already been snapped.

For example, during a certain operation, the operator needs to illuminate a sample with four optical channels of "385", "470", "565", and "625" to obtain four fluorescent images, and merge the four fluorescent images into a fluorescent photograph. After the operator clicks the "385" icon, the "470" icon, and the "565" icon to snap the fluorescent images generated by the light of the three optical channels, the quality of the merged fluorescent photograph is found to be low through the preview window, since the quality of the fluorescent image snapped with the "470" optical channel is problematic and needs to be re-snapped. At this time, the operator only needs to click the "470" icon to re-snap the fluorescent image produced by the light of the "470" optical channel, without re-snapping the fluorescent images of the "385" optical channel and the "565" optical channel which have acceptable quality. The operator then clicks on the "625" icon to obtain the last fluorescent image. After the preview image is considered as qualified, the fluorescent photograph can be obtained by merging. By this method, the time during which the sample is exposed to light due to snapping is reduced, the sample is prevented from being bleached and the snapping time is saved.

It will be understood by those skilled in the art that all or part of the steps of implementing the above method embodiments may be performed by hardware related to the program instructions. The aforementioned program can be stored in a computer readable storage medium. The program, when executed, performs the steps including the foregoing method embodiments; and the foregoing storage medium includes various media that can store program codes, such as a ROM, a RAM, a magnetic disk, or an optical disk. In the method embodiments of the present invention, the sequence numbers of the steps are not used to limit the sequence of the steps. For those skilled in the art, it is also within the scope of the present invention to make successive changes to the steps without any creative work.

Although the present invention has been disclosed above in the preferred embodiments, the present invention is not limited thereto. Any changes and modifications made by those skilled in the art without departing from the spirit and scope of the present invention are intended to be included in the scope of the present invention. Therefore, the scope of the present invention should be determined by the scope defined by the claims.

The invention claimed is:

1. A method for generating a fluorescent photograph using a fluorescence microscope, the fluorescence microscope being provided with a plurality of optical channels, each optical channel corresponding to the light of a different wavelength, the method comprises:
    separately snapping fluorescence images produced by illuminating the sample with light from a plurality of optical channels of the fluorescence microscope;
    then merging each of the fluorescent images into one image to generate a fluorescent photograph of the sample; characterized in that, after a fluorescence image generated by the light of an optical channel is snapped, the fluorescent image generated by the light of said optical channel can be re-snapped and the original fluorescent image can be replaced with the re-snapped fluorescent image, without re-snapping a fluorescent image generated by the light of other optical channel which has already been snapped.

2. The method according to claim 1, wherein fluorescent image display interfaces of the plurality of optical channels are freely switchable there between.

3. The method according to claim 1, wherein the fluorescence microscope is arranged to snap fluorescent images generated by the plurality of optical channels in a certain order, and after snapping a fluorescent image generated by an optical channel, it can be switched to another optical channel which has been previously snapped and re-snap a fluorescent image generated by the optical channel.

4. The method according to claim 1, wherein after snapping the fluorescent image of an optical channel, it automatically jumps to the next optical channel and waits for an instruction to snap a fluorescent image generated by the light of the next optical channel.

5. The method according to claim 1, wherein the number of optical channels can be increased or decreased.

6. The method according to claim 1, wherein a snapping parameter corresponding to each optical channel can be adjusted.

7. The method according to claim 6, wherein the snapping parameter comprises exposure time, gain value, light source intensity, and filter configuration.

8. The method according to claim 1, wherein a preview of the fluorescent photograph merged from the already snapped fluorescent image is displayed on a display screen used in conjunction with the fluorescence microscope.

9. The method according to claim 1, wherein an icon corresponding to each optical channel is displayed on a display screen used in conjunction with the fluorescence microscope.

10. The method according to claim 9, wherein the icon comprises a name of an optical channel, and the name is a wavelength of light corresponding to the optical channel.

11. The method according to claim 9, wherein the icon comprises a color block, and the color of the color block is adjustable.

12. The method according to claim 9, wherein a border of the icon can be highlighted to indicate that the optical channel corresponding to the icon is selected.

* * * * *